United States Patent [19] [11] 4,312,725
Loshaek et al. [45] Jan. 26, 1982

[54] CONTACT LENSES OF HIGH GAS PERMEABILITY AND METHOD

[75] Inventors: Samuel Loshaek; Chah M. Shen, both of Chicago, Ill.

[73] Assignee: Wesley-Jessen, Inc., Chicago, Ill.

[21] Appl. No.: 117,109

[22] Filed: Jan. 31, 1980

Related U.S. Application Data

[63] Continuation-in-part of Ser. No. 913,569, Jun. 8, 1978, Pat. No. 4,228,269.

[30] Foreign Application Priority Data

Jun. 6, 1979 [EP] European Pat. Off. ............ 79301057

[51] Int. Cl.$^3$ .......................... C08F 6/00; C08F 8/00; G02C 7/04
[52] U.S. Cl. ........................... 204/159.22; 351/160 R; 351/160 H; 525/328; 525/329; 525/332; 525/334; 525/367
[58] Field of Search .................. 351/160 R, 160 H; 204/159.22; 525/328, 329, 332, 334, 367

[56] References Cited

PUBLICATIONS

CA, 57, 15327i
British Pol. J., pp. 124 et seq. (Dec. 1976).
"Interaction of Liquids at Solid Substrates," pp. 72-84 (11-68), Fox, R. B. et al.

*Primary Examiner*—Stanford M. Levin
*Attorney, Agent, or Firm*—Warrick E. Lee, Jr.; Vincent H. Gifford; Bruce M. Eisen

[57] ABSTRACT

This invention relates to contact lenses having an oxygen gas permeability constant of at least $$1.5 \times 10^{-11} \frac{\text{ml (O}_2\text{) cm}^2}{\text{sec ml mm Hg}}$$

comprising homopolymers and interpolymers formed by the polymerization of monomers comprising at least one alkyl styrene monomer having at least one $C_1$ or higher alkyl group on the aromatic ring and improved surface wettability and to the method of making such contact lenses utilizing ultraviolet (UV) and chemical treatment.

17 Claims, No Drawings

CONTACT LENSES OF HIGH GAS PERMEABILITY AND METHOD

CROSS-REFERENCE TO RELATED APPLICATION

This application is a continuation-in-part of copending application Ser. No. 913,569, filed on June 8, 1978, U.S. Pat. No. 4,228,269.

BACKGROUND OF THE INVENTION

U.S. patent application Ser. No. 913,569, discloses novel bonnets and contact lenses of high gas permeability comprising a class of polymers not used hitherto for contact lenses. These represent a significant advance in the state of the art, inasmuch as the transmission of oxygen through the contact lens to the cornea is sufficient to provide for the metabolic needs of the cornea. This solves the anoxia problem associated with many rigid contact lenses and among other things, permits longer wear times.

While very satisfactory, these contact lenses have a low surface wettability, the extent being dependent on the particular polymer composition, and this short-fall in surface wettability decreases the lens tolerance time by the lens wearer and may affect visual acuity.

Thus, one of the objectives of the present invention is to provide contact lenses in which the surface wettability of the contact lenses of high gas permeability described in the copending application is greatly improved. Another objective is to control the degree of wettability and thereby extend lens wearing time and comfort.

SUMMARY OF THE INVENTION

The present invention provides improved lenses and a method for making the same wherein improved surface wettability is provided together with increased gas permeability.

Briefly stated, the present invention comprises a contact lens having an oxygen gas permeability constant of at least $$1.5 \times 10^{-11} \frac{\text{ml (O}_2\text{) cm}^2}{\text{sec ml mm Hg}}$$

comprising homopolymers and interpolymers formed by the polymerization of monomers comprising at least one alkyl styrene monomer having at least one $C_1$ or higher alkyl group on the aromatic ring and having its surface modified by chemical treatment or ultraviolet light to lower the contact wetting angle thereof.

The invention also comprises the method of making such lenses as hereinafter described and claimed.

DETAILED DESCRIPTION

The invention provides contact lenses with improved surface wettability and method for making such contact lenses. The requirements for preparing a contact lens of improved surface wettability are:

(1) a polymer which responds to the wettability treatment, (2) shaping of the contact lens from said polymer, and (3) treatment of said contact lens to give surfaces of improved wettability.

Each of these requirements is described in detail herein.

As to high gas permeable polymers which respond to the wettability treatment, they include homopolymers or interpolymers in which at least one of the comonomers is selected from an alkyl styrene monomer having at least one $C_1$ or higher alkyl group on the aromatic ring and an oxygen permeability constant of at least $$1.5 \times 10^{-11} \frac{\text{ml (O}_2\text{) cm}^2}{\text{sec ml mm Hg}}$$

The alkyl substituents are selected from $C_1$ or higher; preferably $C_1$–$C_{12}$, alkyl groups which may be the same or different on any of the ring positions from 2 to 6. In brief, the aromatic ring can be mono-, di-, or tri-substituted on any position in the ring; i.e., with the same or a mixture of the noted groups. Thus, for example, vinyl toluene which contains a methyl substituent in the styrene ring, produces on polymerization, polyvinyl toluene which has a P value of about $2 \times 10^{-11}$, while a tertiary-butyl group in the styrene ring gives poly-t-butyl styrene, which has a P value of about $20 \times 10^{-11}$.

While, as noted above, $C_1$ and higher alkyl substituted polymers form suitable lenses, these lenses made using $C_2$ and higher alkyl groups are preferred because of their superior gas permeability properties as set forth in patent application Ser. No. 913,569. Nevertheless, lenses made with $C_1$ substituents, such as methyl styrene and dimethyl styrene, when treated to improve their surface wettability as described herein, are lenses which are substantially superior in terms of gas permeability and patient comfort over many lenses of the prior art.

Specific examples of styrenes substituted on the ring are methyl styrene (vinyl toluene), ethyl styrene, propyl styrene, butyl styrene, n-butyl styrene, t-butyl styrene, hexyl styrene, n-octyl styrene, t-octyl styrene, decyl styrene, dodecyl styrene, 2, 5 dimethyl styrene, 2, 6 dimethyl styrene, 2, 4, 6 trimethyl styrene, and 2, 5 diethyl styrene. The foregoing examples are illustrative of suitable substituted sytrenes, but are not intended to limit the scope of the invention. Of all the polymers, at the present time, it is believed that the most suitable with respect to gas-permeability and other desirable contact lens properties are polymers wherein the principal monomers used are t-butyl styrene or isopropyl styrene.

Olefinically unsaturated polymerizable monomers may be interpolymerized with the alkyl styrene monomers to give interpolymers with specific properties. Said olefinically unsaturated monomers may be of the hydrophobic or hydrophilic types.

The olefinically unsaturated polymerizable monomer component used will depend upon the particular lens characteristics desired, such as machineability, moldability, hardness, softening temperature, and the like. Such monomers may include styrene type monomers other than the gas permeable styrene monomers noted previously.

Hydrophilic monomers may be added to improve surface wettability so that after surface treatment by the methods of the present invention, even better surface wettability is provided.

Examples of one class of hydrophilic monomers are the hydroxy alkyl acrylates and methacrylates; suitable examples being hydroxyethyl methacrylate, hydroxyethyl acrylate, hydroxy-polyethoxy ethyl methacrylate and the like. Examples of another class of suitable hydrophilic monomers are the N-vinyl heterocyclic monomers, suitable examples of such monomers being N-vinyl-2 pyrrolidone, N-vinyl pyridine and N-vinyl-ε-caprolactam. Also, another class of hydrophilic monomers are the polymerizable olefinic acids and amides; suitable examples being acrylic acid, methacrylic acid, itaconic acid, fumaric acid, maleic acid, crotonic acid, acrylamide, methacrylamide and N-(1,1-dimethyl-3-oxobutyl acrylamide). Another suitable group of hydrophilic monomers are the lower alkyl vinyl ethers such as methyl and ethyl vinyl ether.

Suitable hydrophobic monomers are the olefinically unsaturated polymerizable monomers with one polymerizable double bond per molecule. Suitable examples of such monomers are the linear or branched $C_1-C_{12}$ alkyl esters of acrylic and methacrylic acid such as methyl acrylate, ethyl acrylate, butyl acrylate, 2-ethylhexyl acrylate, methyl methacrylate, ethyl methacrylate, butyl methacrylate, cyclohexyl methacrylate, 2-ethylhexyl methacrylate, 2-ethoxyethyl methacrylate, decyl and dodecyl methacrylate and the like monomers. Examples of other suitable hydrophobic monomers are the higher vinyl ethers such as butyl vinyl ether and vinyl acetate, vinyl chloride, vinyl propionate, isoprene, vinyl carbazole, and styrene monomers other than those defined above for providing the gas permeability, including, alkoxy styrenes, e.g., methoxy and ethoxy styrene, halogenated styrenes, hydroxyalkyl styrenes, alkoxy alkyl styrenes, and polyalkoxyether styrenes.

With respect to proportions of comonomers, it must be noted that the gas permeability is reduced as the amount of monomer or monomers other than the gas permeable styrene monomers are increased. Therefore, it is desired to use the minimum amount of such comonomer which will give the desired modification in polymer characteristics.

While suitable interpolymers may consist of monomer and comonomer units as defined above, units derived from cross-linking monomers may also be included in the interpolymer. The cross-linking monomers may be added to modify various physical characteristics of the interpolymers, such as increasing its hardness, improving its machineability and stability and increasing its resistance to surface crazing, which may result as UV or chemical treatment time is increased. Surface crazing takes the form of minute parallel striations on the lens surface when viewed by reflected light at a certain angle. Examples of suitable cross-linking monomers are divinyl benzene, di- and higher functionality methacrylates and acrylates such as ethylene glycol dimethacrylate, tetraethylene glycol dimethacrylate, polyethylene glycol dimethacrylate, trimethylol propane trimethacrylate, pentaerythritol tetramethacrylate, and allyl methacrylate, allyl itaconate, diallyl itaconate, diallyl adipate and methylenebisacrylamide. The foregoing examples of cross-linking monomers are merely illustrative and are not intended to limit the scope of the invention, and they may be used individually or in combination.

The amount of cross-linking monomer in the interpolymer, if used, is the minimum amount which will give the desired improvement since the gas permeability of the interpolymer and lens is reduced as the proportion to cross-linking monomer relative to gas permeable styrene monomer is increased. Usually up to about 10% by weight in the interpolymer fulfill the above requirements, but the scope of this invention is not intended to be limited thereby.

It is also within the scope of the present invention to include minor amounts of plasticizer, up to about 20% by weight of the total mixture of polymer and plasticizer, to increase the gas permeability or to improve the machineability or moldability if desired. Examples of suitable plasticizers are diethyl phthalate, dibutyl phthalate, diisobutyl phthalate, dihexyl phthalate, dioctyl phthalate, butylbenzyl phthalate, dodecyl phthalate, diethyl adipate, dibutyl adipate, diisobutyl adipate, dihexyl adipate, dioctyl adipate, dibutyl azelate, dihexyl azelate, dioctyl azelate, dibutyl sebacate, dioctyl sebacate, butyl benzoate, glyceryl triacetate (triacetin), glyceryl tributyrate, dibutyl citrate, tributyl citrate, chlorinated paraffins, phosphoric acid derivatives such as tributyl, triphenyl and trioctyl phosphates, expoxidized vegetable oils, such as epoxidized soybean oil, and polymeric plasticizers such as poly alpha-methyl styrene and polyesters.

The particular plasticizer chosen must be compatible with the polymer so that optical clarity is maintained under conditions of use.

In addition to the optional use of cross-linking monomers and plasticizers, other materials may be optionally included in the polymer from which the bonnets and contact lenses are made, such as coloring agents, light absorbers and the like which are sometimes used in making contact lenses, so long as these other materials do not adversely affect the desired properties of the instant bonnets and lenses made from the polymers. These materials are added in their usual proportions for their usual effects.

The polymers of the invention are preferably formed by the use of conventional free radical polymerization procedures in which the usual free radical initiators can be used. Examples are benzoyl peroxide, di-t-butyl peroxide, t-butyl perbenzoate, 2, 5-dimethyl-2, 5-bis(2-ethyl hexoyl peroxy)hexane, lauroyl peroxide, t-butyl hydroperoxide, azobisisobutyronitrile, diisopropyl peroxydicarbonate, t-butyl-peroxypivalate, and the like. The amounts employed are conventional and are such as to give a controlled polymerization at conventional polymerization temperatures. The polymerization method and conditions (such as time and temperature), as well as the apparatus, are those conventionally employed and detailed discussion is not deemed necessary since they are well known to those skilled in the polymerization art. Moreover, these conditions are not intended to limit the scope of the present novel contact lenses.

The second requirement is making the contact lenses of the invention is to form a contact lens from the selected polymer composition. The contact lens can be formed by any of the conventional lathing and polishing and molding processes. Molding cannot be used for polymers which are cross-linked during polymerization. For lathing, typically, the selected polymer composition is prepared in cylindrical rod form by polymerizing the monomers in a glass or plastic or other suitable tube. The rod of polymer is removed and after cutting the diameter to the desired dimension on a lathe or centerless grinder, is sliced into about ¼ inch thick slices which are known as slugs or bonnets in the art. The rod may be cut into bonnets with a flange around the circumference which flange is used to hold the bonnet in a suitable device which can be held in a lathe chuck for lathing. The non-flanged bonnets may be adhered with a suitable wax to a spindle which can be held in a lathe chuck. In commercial practice, bonnets are often sold by one manufacturer to another who will then machine the bonnet into a contact lens. The scope of this invention includes bonnets as well as contact lenses. However, it is understood that such bonnets will be converted to lenses and then the surfaces of the lenses would be made wettable as described herein. Alternatively, the lens can be directly molded if no cross-linking monomer is used in the polymer.

The third requirement in making the contact lenses of the invention is to provide surfaces theron which are adequately wettable. Both the posterior and anterior surfaces must be wettable.

A chemical treatment or exposure of the lens to ultraviolet radiation may be used. Ultraviolet radiation is preferred since it avoids the use of corrosive solutions and can easily be performed with simple equipment in the lens manufacturing facility or doctor's office or by the patient. Especially since the surface wettability of the contact lens decreases with continued use, it is important that retreatment of the surfaces to make them wettable is possible. Although the lens can be returned to the contact lens producer or manufacturer for treatment, it is most convenient to have a treatment method which can also be performed by the patient. Both methods are described in the following.

The chemical method consists of immersing the lens for an appropriate time and temperature in what may be characterized as an oxidizing medium or sulfonating medium or a combination thereof. It is not known whether the reaction is one of sulfonation, when sulfonic groups are present, or oxidation or a combination of both. While the prior art discloses chemical treatment of polymer surfaces, such treatment has not been applied to contact lenses made from the homopolymers and interpolymers of the instant invention thereby providing the combined properties of high gas permeability and wettability. Nor has cross-linking been used to prevent surface crazing from extended treatment. An example of a treatment solution is a mixture of potassium dichromate, sulfuric acid, and water. A ratio of 5:100:8 by weight of potassium dichromate; sulfuric acid; water is effective. This ratio can be varied so long as an improvement in wettability is obtained. Generally, an increase in time and temperature of immersion increases the surface wettability. Examples of suitable temperatures are from room temperature to 80° C., and times from 30 minutes to 24 hours or longer. Temperatures and times are not critical and can be optimized to give the wettable surface within a convenient time under easily maintained conditions. For example, it may be more convenient to treat the lenses at room temperature even though a longer time period is required.

It has been found that poly-t-butyl styrene is only very slightly susceptible to the chemical treatment (sulfonation and/or oxidation) for improvement of surface wettability but responds to the ultraviolet radiation treatment. The copolymer formed by replacement of a minor proportion, e.g., 20% by weight of the t-butyl styrene with styrene or isopropyl styrene is susceptible to the chemical treatment and lower amounts of these monomers are also effective. In general, the addition of small amounts, e.g., even less than 5% by weight of styrenic monomers to t-butyl styrene will show some improvement. The choice of styrenic monomer will depend on the properties desired, thus, the inclusion of isopropyl styrene may be preferable to styrene because of the relatively higher gas permeability produced by isopropyl styrene as discussed in the copending patent application.

The ultraviolet (UV) irradiation treatment of the contact lens surfaces requires the exposure of the surfaces to a UV source of appropriate wavelengths for a suitable time. This method has not been previously applied to the surface of contact lenses made of the polymers of the instant invention. As with chemical treatment, cross-linking of the polymer has been found effective in controlling surface crazing. As to suitable radiation, so-called germicidal lamps have been found to be effective. Such lamps are low pressure mercury vapor lamps which give off predominant radiation at 2537 Angstroms. There is, in fact, a bell shaped distribution of wavelength at longer and shorter wavelengths with the peak being at 2537 Angstroms. Suitable lamps are manufactured by the General Electric Co., a typical example being the G15T8. A number of such lamps of different shapes and wattages are available. A medium pressure mercury lamp such as the General Electric UA-3 is also suitable. Another commercially available lamp which gives radiation in the same wavelength range which has been used is the UVSL25 Mineralight model manufactured by UltraViolet Products Inc.

The rate at which and the ultimate wettability is obtained on a given surface will depend on the wattage of the lamp used, the intensity of radiation at the lens surface, which is determined by the distance between the light source and the lens, and the wattage of the light source and the time of treatment. Thus, for example, the use of lower intensity (i.e., lower lamp wattage) can be compensated for by a longer radiation time. Under a given set of conditions, it has been found that there is a rather rapid increase in wettability on initial exposure, followed by small increases in wettability with further exposure. For example, with a 4 watt source at 1 cm. from a contact lens surface made of cross-linked or uncross-linked t-butyl styrene, the contact wetting angle of saline solution on the surface drops from about 93° to about 67° in the first two hours of treatment and then drops to about 66° with an additional 14 hours of treatment. It is not intended to limit the scope of the invention by specific treatment conditions since improvements in wettability are obtained by appropriate choice of the foregoing variables. The effective wavelength of light appears below about 3000 Angstroms.

It has previously been noted that hydrophilic monomers can be added to improve surface wettability, but at the expense of lowering gas permeability. It has been found the surface wettability of lenses made from such copolymers can be further improved by the methods described above.

While the surface wettability provided by said treatments gradually decrease with use of the lens, the surface wettability improvement, which in itself may be insufficient, provided by the use of hydrophilic interpolymers above, does not show such decrease. However, the replacement of some of the gas permeable monomer with hydrophilic monomer in preparing such interpolymers will usually reduce the gas permeability. Thus, depending on the desired combination of lens properties, it may be advantageous to combine surface treatment of interpolymers comprising the styrene monomers of the instant invention and hydrophilic monomers.

Now as to the method of assessing wettability of the contact lens surface, the most significant method is clinical examination of the contact lens on the eye with a slit lamp. Lack of wettability is indicated by a breakup of the tears of the eye on the lens surface rather than a smooth coating of tears thereon. This method is, however, time consuming and impractical for characterizing a large number of polymer surfaces. Accordingly, wettability herein is characterized by measurement of the contact angle of a drop of normal saline on the flat polymer surface, the polymer corresponding to that of the contact lens. Although measurements can be made on a curved lens surface, they are usually not as reliable.

Contact angles may be measured by any suitable method and a number of these methods have been reported in the literature. The absolute value of the contact angle will depend on the instrument used, the environmental conditions, method of sample conditioning and specific procedure. In the present work, the objective is to measure the change in contact angles, thus only the relative values are important and not the absolute values. Accordingly, the same instrumentation was used throughout this work and a control sample without treatment was measured along with the treated sample. The sample preparation, conditioning, environment, etc., were the same for the sample and the control.

In some instances, extended surface treatment with UV or chemicals results in surface crazing of the lenses. This can be ameliorated by addition of a cross-linking monomer discussed above.

Because of the long experience in the contact lens industry with polymethyl methacrylate (PMMA) lenses, it is helpful to use the contact wetting angle of PMMA as a criterion for clinical acceptance of wettability. By the Contascope method used in the present work, the contact angle of saline solution on PMMA is about 73°–75°, which is typical of values reported in the literature. It has now been established clinically that the majority of lens wearers can tolerate this level of wettability and perhaps a portion of the lens wearing population can tolerate a somewhat lesser wettability corresponding to about 80°. There are some so-called "dry-eyed" people or "non-blinkers" who may need a somewhat greater wettability. The use of contact lens wetting solutions, a large number of which are available commercially, also aids in the wearing of contact lenses. Thus, in the instant invention, the clinical suitability of a contact lens from the standpoint of wettability can be assessed against the contact angle for PMMA. In some instances, measurement of the contact angle on PMMA were made for the foregoing and also because PMMA provides a known standard which permits a check on the contact angle measurement method. Specifically, in the present work, a Contascope is used for measuring wettability, however, any suitable method may be employed and the method of measurement is not intended to limit the scope of this invention.

The procedure used herein for measuring the contact wetting angle is described in the following: A polymer sample typically a right cylinder of 10 mm. diameter and 1.3 mm. thick with flat end surfaces, one of which is polished to about the same degree as a contact lens, is placed on the stage of the Contascope (Wesley-Jessen Inc.). A 3 microliter drop of normal saline (contains 0.9% by weight of salt in water) is placed on the polished surface with a microsyringe. Normal saline is used since it approximates the salinity of human tear fluids. The sample surface and drop are projected in enlarged cross-section on the Contascope screen. The height of the drop (h) at its center and the length of the base of the drop (2d) are read on a scale. The contact wetting angle (C.A.) is then calculated from $C.A. = 2 \tan^{-1}(h/d)$. Usually five repeat measurements are made and the average value is used.

Prior to measurement, the sample surface is conditioned by rubbing between the fingers with a selected commercial contact lens cleaner for 15 seconds and then rinsed with distilled water for 10 seconds. It is then immersed in approximately 40 ml of distilled water in a beaker which is then placed in an ultrasonic cleaning device for a selected time. e.g., 15 minutes. The sample disc is then wiped dry with tissue paper and static charge is removed with a Static Master, the latter without touching the sample surface. This conditioning procedure may be varied so long as the sample and the control are treated alike.

It is desirable for the wettable surface to be retained in use by the contact lens wearer as long as possible. Usually, in use, a contact lens is subjected to rubbing and rinsing during cleaning, storage as well as wear, all factors which may deteriorate the wettable surface. When such surfaces become inadequately wettable, for example, the contact wetting angle exceeds about 80°, the surface must be retreated. The point at which retreatment is required can be determined by the subjective comfort of an individual patient as well as by objective slit lamp examination to ascertain what a uniform tear layer is maintained over both lens surfaces.

In order to evaluate the wettability permanence of a particular polymer with a particular surface treatment, a simulated cleaning/storage procedure was used. The polished side of the sample disc is rubbed firmly with a commercial lens cleaner for 30 seconds and the cleaner is rinsed off with running tap water for 10 seconds. This procedure is repeated 5 times, allowing the rinsed disc to air dry in between cleanings. This is referred to as 5 "aging" cycles. The aged surface is then subjected to the preparation and measuring procedure described previously. Typically, 5 cycles are performed on one day and the sample is soaked in normal saline overnight. As a typical example, polymers of t-butyl styrene irradiated by UV for 5 hours start out with a contact wetting angle of about 67°–69°, and after 50 aging cycles, reach 77°. This can be considered to indicate that the lens can be worn for approximately 50 days before retreatment, however, the actual retreatment time may vary on either side of 50 days. The untreated t-butyl styrene has a contact angle of about 94°. Further, it was found that the high gas permeability of the contact lens made from this material did not change appreciably as the result of the surface treatment. A subject wearing such a treated lens was able to wear the lens for six weeks without loss of comfort, due to deterioration of wettability, while the untreated lens could not be worn comfortably by this particular patient.

The invention is further described by the following examples which are given for the purposes of illustration only and are not meant to limit the scope of the invention.

EXAMPLE 1

A polymer consisting of 99 parts by weight of t-butyl styrene and 1 part by weight of ethylene glycol dimethacrylate was prepared in rod form in a test tube. A slice from this rod was used to prepare a sample disc 10 mm. in diameter and 1.3 mm. thick and one of the flat surfaces was polished to simulate a contact lens surface. The disc was placed 1 cm. away from a 4 watt UVSL-25 mineral light which gave off predominant radiation at 2537 Angstroms and was irradiated for various times. Contact angles were measured at the end of each period of irradiation and then the sample was subjected to the next period of radiation. Before each contact angle measurement, the polished surface was rubbed with LC-65 contact lens cleaner (a product of Allergan Pharmaceutical Co.) followed by 10 seconds of rinsing with distilled water from a squeeze bottle. The sample was then immersed in about 40 ml. of distilled water and subjected to ultrasonic cleaning for 5 minutes. The wetting angle was measured by the Contascope method described previously, and the results are given in Table I below.

TABLE I

Effect of Time of UV Irradiation on Contact Angle

| No. Hours Irradiated 0 (control) | Contact Angle in Degrees |
|---|---|
| 0 | 93 |
| 1 | 86 |
| 2 | 67 |
| 4 | 72 |
| 6 | 69 |
| 9 | 67 |
| 11.5 | 68 |
| 16 | 66 |

Measurement of the gas permeability constant on a sample of the same composition, before and after UV irradiation shows only a very slight decrease in permeability.

This example shows the marked improvement obtained in the wetting angle of this cross-linked poly t-butyl styrene polymer as a result of the UV treatment. Also it is seen that a large portion of the improvement occurs within the first two hours of treatment.

EXAMPLE 2

This example shows the degree of permanence of the UV wettability treatment. The composition of the sample and the sample form were the same as that set forth in Example 1 and the sample was irradiated for a period of 5 hours by the method of Example 1. It was then "aged" 5 cycles at a time by the cleaning method described previously. After each 5 cycles, the contact angle was measured, the sample being subjected to the conditioning treatment described in Example 1 prior to each measurement except that the ultrasonic cleaning time was 15 minutes. Since static electricity was evident, the static charge was removed with a Static Master prior to measurement. The untreated sample gave a contact angle with saline of 93°–95°. The contact angle on a PMMA sample with no irradiation, but equivalent tretment otherwise, was measured alongside that of the treated sample for comparison. The results are set forth in Table II below.

TABLE II

Effect of Repeat Aging Cycles on Contact Angle

| No. of Cycles | Contact Angle of Treated Sample* | Contact Angle on PMMA |
|---|---|---|
| 0 | 69 | 77 |
| 5 | — | 73 |
| 10 | 74 | 71 |
| 15 | 74 | 76 |
| 20 | 70 | 73 |
| 25 | 71 | 77 |
| 30 | 70 | 75 |

TABLE II-continued

Effect of Repeat Aging Cycles on Contact Angle

| No. of Cycles | Contact Angle of Treated Sample* | Contact Angle on PMMA |
|---|---|---|
| 35 | 72 | 73 |
| 40 | 74 | 75 |
| 45 | 70 | — |
| 50 | 77 | — |

Contact angle in degrees
*Untreated t-butyl styrene sample gives a contact angle of 93°–95°.

The results show that the wettability treatment has substantial permanence.

EXAMPLE 3

Polymer samples were prepared wherein the t-butyl styrene was partially replaced with styrene. Sample discs were prepared from these polymers as in Example 1 and contact angles measured after 5 hours of UV irradiation treatment by the methods of Example 1. The results are given in Table III.

TABLE III

Effect of Polymer Composition

| Polymer Composition % by Weight* | | | Contact Angle Before UV | Contact Angle After UV |
|---|---|---|---|---|
| t-Bs | St | EGD | | |
| 94 | 5 | 1 | 92 | 68 |
| 89 | 10 | 1 | 92 | 65 |
| 84 | 15 | 1 | 92 | 63 |

Contact angle in degrees
*t-Bs = T-butyl styrene, St = Styrene, EGD = ethylene glycol dimethacrylate

EXAMPLE 4

A pair of contact lenses were prepared to prescription from the polymer of Example 1, and both surfaces of each lens were irradiated by the method of Example 1 for 5 hours, giving a contact angle of 74°*. The lenses were placed on the patient's eyes and examined with a slit lamp. There was a continuous smooth wetting of the lenses by tears. The patient wore the lenses on a daily basis (about 12 hours per day) for eight weeks with good comfort and visual acuity, at the end of which time visual acuity began to fall off and slit lamp examination revealed some tear breakup on the lens. This particular patient was unable to wear PMMA lenses successfully in the past after repeated attempts. Thus, the high oxygen permeability of these lenses made of poly-t-butyl styrene resolved the wearing problem. The lenses were next irradiated again for 2.5 hours and a contact angle of 75°* was observed. The patient was again able to wear these retreated lenses with good comfort and visual acuity.
*Measurement of contact wetting angle on lenses instead of a flat disc give a value of about 5° higher.

EXAMPLE 5

Sample discs of different polymer materials were prepared as described in Example 1 and immersed in about 10 ccs of a treatment solution consisting of $K_2Cr_2O_7:H_2SO_4:H_2O$ in a ratio of 1:12:1.7 held in a capped glass vial. The vial was placed in a 60°0 C. oven for 16 hours. The sample was then removed, rinsed with distilled water and immersed in a boric acid buffered aqueous solution of pH 8 for at least one hour, after which the contact angle was measured by the Contascope method. The compositions of the polymers so treated and the results are given in Table IV.

TABLE IV

Chemical Wettability Treatment of t-Butyl Styrene Copolymers

| Polymer Composition % By Weight | | | | Contact Angle In Degrees After |
|---|---|---|---|---|
| Sample No. | t-bs | St | IPS | EGD | Treatment |
| 1 | 99 | 0 | 0 | 1 | 88 |
| 2 | 79 | 20 | 0 | 1 | 71 |
| 3 | 69 | 30 | 0 | 1 | 62 |
| 4 | 0 | 0 | 99 | 1 | 71 |
| 5 | 79 | 0 | 20 | 1 | 72 |

*t-bs = tertiary butyl styrene, St = styrene, IPS = isopropyl styrene, EGD = ethylene glycol dimethacrylate
**Before treatment the contact angles of the samples ranged from 90°–92°.

It is noted that while the poly-t-butyl styrene is resistant to this chemical treatment, the inclusion of styrene or isopropyl styrene in the copolymer makes it highly susceptible to chemical treatment. The poly-t-butyl styrene is, however, not resistant to the UV irradiation treatment as demonstrated in Example 1.

The oxygen permeability constants on a contact lens sample made of the polymer composition in sample number 4 of Table IV, before and after treatment were found to be $12.9 \times 10^{-11}$ and $13.5 \times 10^{-11}$, respectively, showing that the permeability of the lens is virtually unchanged by the treatment. The units of the permeability constant is $$\frac{ml\ O_2\ cm^2}{sec\ ml\ mm\ Hg}$$

As noted in copending application Ser. No. 913,569, permeability constants used herein are measured at ambient room temperature, more specifically at about 21°–23° C.

EXAMPLE 6

For comparison, sample disc number 2 of Table IV was treated by the same method except that the concentration of the chromate was reduced in relation to $H_2SO_4$, namely, $K_2Cr_2O_7:H_2SO_4:H_2O = 1:20:1.6$. The contact angle was found to be 75°. When treatment was carried out at room temperature (23° C.), the contact angle was found to be about 80°. Thus, it appears that the solution with higher chromic acid content is somewhat more effective and that longer treatment times or higher temperature or both, are required for an equivalent result.

EXAMPLE 7

Example 1 was repeated except that the polymer composition was replaced successively with 95 parts by weight of t-butyl styrene and 5 parts by weight of ethylene glycol dimethacrylate (EGD) and 88 parts by weight of t-butyl styrene and 12 parts by weight of EGD. Increasing the cross-linking monomer EGD produced a material which machined with less drag on polishing and which polished out with fewer scratches. Also, the inclusion of the EGD increased the resistance of the lens to surface crazing resulting from the UV treatments. The gas permeability constant was slightly lower, but otherwise the lens was comparable to that in Example 1.

EXAMPLE 8

Example 1 was repeated except that the polymer composition was replaced with 65 parts of t-butyl styrene, five parts of ethylene glycol dimethacrylate and 30 parts of N-vinyl-2-pyrrolidone. One of the lenses made from this material was not treated with UV (control) while another was irradiated for five hours as in Example 1. Both lenses were then equilibrated in physiological saline giving a water content of about 10% by weight. The lenses were rigid in this state and appeared and felt like a typical hard polymethyl-methacrylate lens rather than a typical hydrophilic soft lens. The unirradiated and irradiated lenses, both have permeability constants of about $8 \times 10^{-11}$. The contact wetting angle of the unirradiated control lens is about 84° and that of the irradiated lens is about 75°. The contact wetting angle of a polymethyl methacrylate lens measured at the same time under the same conditions was about 80°. Note that wetting angle measurements were performed on lenses so that values are about 5° higher than on flats.

This example shows that while the introduction of a hydrophilic monomer reduces the wetting angle, the angle is further reduced by the UV treatment.

While the invention has been described in connection with preferred embodiments, it is not intended to limit the scope of the invention to the particular form set forth, but, on the contrary, it is intended to cover such alternatives, modifications, and equivalents as may be included within the spirit and scope of the invention as defined by the appended claims.

What is claimed is:

1. A contact lens having an oxygen gas permeability constant of at least $$1.5 \times 10^{-11} \frac{ml\ (O_2)\ cm^2}{sec\ ml\ mm\ Hg}$$

comprising homopolymers and interpolymers formed by the polymerization of monomers comprising at least one alkyl styrene monomer having at least one $C_1$ or higher alkyl group on the aromatic ring and having its surface modified by chemical treatment or ultraviolet light to lower the contact wetting angle thereof.

2. The contact lens of claim 1 having a contact wetting angle below about 85°.

3. The contact lens of claim 1 comprising a homopolymer of an alkyl styrene monomer having at least one $C_1$ or higher alkyl group on the aromatic ring.

4. The contact lens of claim 3 wherein the alkyl styrene monomer is t-butyl styrene or isopropyl styrene.

5. The contact lens of claim 1 wherein the interpolymer is formed by the polymerization of monomers comprising at least one alkyl styrene monomer having at least one $C_1$ or higher alkyl group on the aromatic ring and a compatible cross-linking monomer.

6. The contact lens of claim 1 wherein the monomers include a monoolefinically unsaturated polymerizable monomer other than said alkyl styrene monomer.

7. The contact lens of claim 6 wherein the monoolefinically unsaturated polymerizable monomer is selected from hydrophilic monomers, hydrophobic monomers, or mixtures thereof.

8. The contact lens of claim 7 including a compatible cross-linking monomer.

9. The contact lens of claim 5 or 8 wherein the cross-linking monomer is selected from divinyl benzene, di- and higher functionality methacrylates and acrylates selected from ethylene glycol dimethacrylate, tetraethylene glycol dimethacrylate, polyethylene glycol dimethacrylate, trimethylol propane trimethacrylate, pentaerythritol tetramethacrylate, allyl methacrylate, allyl itaconate, diallyl itaconate, diallyl adipate or methylenebisacrylamide.

10. The contact lens of claim 6, 7, or 8 wherein the monoolefinically unsaturated polymerizable monomer is a hydrophilic monomer selected from hydroxyalkyl acrylates or methacrylates N-vinyl heterocyclic monomers, polymerizable olefinic acids or amides, or lower alkyl vinyl ethers.

11. The contact lens of claim 6, 7, or 8 wherein the monoolefinically unsaturated polymerizable monomer is a hydrophobic monomer selected from $C_1$-$C_{12}$ alkyl esters of acrylic or methacrylic acid, vinyl acetate, vinyl chloride, vinyl proprionate, isoprene, vinyl carbazole, styrene, alkoxy styrenes, halogenated styrenes, hydroxyalkyl styrenes, alkoxy alkyl styrenes, polyalkoxyether styrenes, or higher vinyl ethers.

12. The contact lens of claim 5 or 8 wherein the alkyl styrene monomer is t-butyl styrene or isopropyl styrene, the cross-linking monomer is selected from divinyl benzene, di- and higher functionality methacrylates and acrylates selected from ethylene glycol dimethacrylate, tetraethylene glycol dimethacrylate, polyethylene glycol dimethacrylate, trimethylol propane trimethyacrylate, pentaerythritol tetramethacrylate, allyl methacrylate, allyl itaconate, diallyl itaconate, diallyl adipate or methylenebisacrylamide, and the monoolefinically unsaturated polymerizable monomer is a hydrophilic monomer selected from hydroxyalkyl acrylates or methacrylates, N-vinyl heterocyclic monomers, polymerizable olefinic acids or amides, or lower alkyl vinyl ethers.

13. The method of lowering the contact wetting angle of a contact lens having an oxygen gas permeability constant of at least $$1.5 \times 10^{-11} \frac{\text{ml }(O_2) \text{ cm}^2}{\text{sec ml mm Hg}}$$

comprising a homopolymer or interpolymer formed by the polymerization of monomers comprising at least one alkyl styrene monomer having at least one $C_1$ or higher alkyl group on the aromatic ring, comprising exposing the surfaces of said lens to an oxidizing solution at a temperature and for a time sufficient or an ultraviolet light at a wattage and wavelength sufficient to lower the contact wetting angle thereof below that of untreated lenses of identical composition.

14. The method of claim 13, wherein the contact wetting angle after exposing the surfaces of the lens is below about 80°.

15. The method of claim 13, wherein the chemical treatment consists of an oxidizing solution consisting essentially of $K_2Cr_2O_7$:$H_2SO_4$:$H_2O$.

16. The method of claim 15, wherein the ratio of $K_2Cr_2O_7$:$H_2SO_4$ is in the range of 1:12 to 1:20.

17. The method of claim 13, wherein the ultraviolet light has a wavelength of below 3000 Angstroms.

* * * * *